United States Patent [19]

Kobayashi et al.

[11] Patent Number: 5,168,435
[45] Date of Patent: Dec. 1, 1992

[54] CONVERTER

[75] Inventors: Tadashi Kobayashi; Tokimune Kitajima; Yohsuke Shinada; Teruhisa Sudou; Toshiyuki Kawano; Masahiro Sonoki, all of Tokyo, Japan

[73] Assignee: NEC Corporation, Tokyo, Japan

[21] Appl. No.: 708,485

[22] Filed: May 31, 1991

[30] Foreign Application Priority Data

Jun. 8, 1990 [JP] Japan ................ 2-60154[U]
Jun. 8, 1990 [JP] Japan ................ 2-148615
Feb. 7, 1991 [JP] Japan ................ 3-16158

[51] Int. Cl.⁵ .......................... H02M 3/335
[52] U.S. Cl. ........................ 363/20; 363/21; 363/95; 323/901
[58] Field of Search ............ 363/20, 21, 49, 95, 363/97; 323/901

[56] References Cited

U.S. PATENT DOCUMENTS

| 4,058,758 | 11/1977 | Peterson | 363/21 X |
| 4,208,705 | 6/1980 | Hosoya | 363/49 X |
| 4,295,188 | 10/1981 | Brunssen | 363/21 |
| 4,498,128 | 2/1985 | Peterson et al. | 363/21 |

Primary Examiner—Emanuel T. Voeltz
Attorney, Agent, or Firm—Laff, Whitesel, Conte & Saret

[57] ABSTRACT

According to this invention, a converter includes a voltage transformer, a switching transistor, a resistor, a control transistor, and a control circuit. The voltage transformer has a primary winding, a secondary winding, and a control winding. The switching transistor is connected in series with the primary winding. The resistor is connected between the switching transistor and one terminal of an input power source. The control transistor has a base connected to a connection point between the resistor and the switching transistor and a collector connected to a control electrode of the switching transistor. The control circuit controls the control transistor on the basis of a control voltage extracted from the control winding.

5 Claims, 6 Drawing Sheets

CONVERTER

BACKGROUND OF THE INVENTION

The present invention relates to a converter having an improved control operation on a primary side.

FIG. 8 is a circuit diagram showing a conventional converter.

Referring to FIG. 8, reference numeral 1 denotes an input DC power source; 2, an input capacitor; 3, a starting resistor; 37, a clamp circuit constituted by diodes 4 and resistor 5 and a capacitor 6; 9, a voltage transformer; 10, a rectification diode; 11, a smoothing capacitor; 12, a load; 29, a control resistor; 30, a diode; 31, a speed-up capacitor; 32, a switching transistor; and 38, a current control circuit constituted by a resistor 15 and a transistor 16; 39, a control circuit constituted by a resistor 33, a variable shunt regulator 34, resistors 35 and 36, and a diode 18, and a capacitor 19.

The operation of the converter will be described below.

When a current from the input DC power source 1 is supplied in the converter, a base current is supplied to the switching transistor 32 through the starting resistor 3, thereby starting the operation of the converter. When the switching transistor 32 is turned on, a voltage is applied to a primary winding $N_P$ of the voltage transformer 9, and a voltage is induced from a control winding $N_R$ of the voltage transformer 9 proportionally to the turn ratio of the control winding $N_R$. A base current is supplied to the switching transistor 32 through the control resistor 29 to keep the switching transistor 32 in an ON state, and an energy is stored in the voltage transformer 9. When the switching transistor 32 is saturated at a point, the switching transistor 32 is turned off, and a counter electromotive force is generated across the base and emitter of the switching transistor 32 to rapidly turn the converter off. Therefore, the energy stored in the voltage transformer 9 is supplied to the load 12 through the rectification diode 10 and the smoothing capacitor 11.

In the control circuit 39, an output potential is generated proportionally to a turn ratio of the control winding $N_R$ to a secondary winding $N_s$ of the voltage transformer 9 by the diode 18 and the capacitor 19 across the two terminals of a series circuit constituted by the resistors 35 and 36. The base current of the switching transistor 32 is controlled through the variable shunt regulator 34 by a voltage obtained by dividing an output potential which is generated across the two terminals of the series circuit by the resistors 35 and 36. Thus, the switching transistor 32 is turned on/off, and an output voltage is stabilized.

The current control circuit 38 turns the transistor 16 on using a connection-point potential between the resistor 15 and the switching transistor 32 as a detection potential to reduce a base current flowing through the switching transistor 32.

According to the above conventional converter, however, since a bipolar transistor is used as the switching transistor 32, an increase in switching speed is limited by a storage time of the bipolar transistor, and the converter cannot be formed to be compact.

In addition, in the conventional converter, in a case wherein a control current which can be supplied from a control voltage detector is small and the variable range of the current is narrow (e.g., when a shunt regulator is used as the control voltage detector), when a variable range of a current flowing through the impedance circuit is increased due to a wide input voltage variable range of the converter, or when a base current variable range of the switching transistor is increased due to a wide load variable range of the converter, a sufficient control current cannot be supplied to the converter when a high input voltage and a light load are applied to the converter. Therefore, the output voltage of the converter cannot be controlled, and the output voltage is abnormally increased. On the contrary, when the converter is arranged to have a sufficient control current, the efficiency of the converter is degraded.

SUMMARY OF THE INVENTION

It is an object of the present invention to provide a converter capable of increasing a switching speed.

It is another object of the present invention to provided a converter formed to be compact.

It is still another object of the present invention to provide a converter capable of stabilizing an output even when a control current is small and a control range is narrow.

It is still another object of the present invention to provide a converter in which the efficiency is not degraded when a high input voltage and a light load are applied to the converter.

It is still another object of the present invention to provide a converter for preventing an accidental electric shock after an AC plug is drawn from an outlet.

It is still another object of the present invention to provide a converter capable of a shortening a starting time and reliably performing a starting operation.

In order to achieve the above objects, according to the present invention, there is provided a converter comprising a voltage transformer having a primary winding, a secondary winding, and a control winding, a switching transistor connected in series with the primary winding, a resistor connected between the switching transistor and one terminal of an input power source, a control transistor having a base connected to a connection point between the resistor and the switching transistor and a collector connected to a control electrode of the switching transistor, and a control circuit for controlling the control transistor on the basis of a control voltage extracted from the control winding.

DESCRIPTION OF THE PREFERRED EMBODIMENTS

A converter according to the present invention will be described below.

Figure 1:
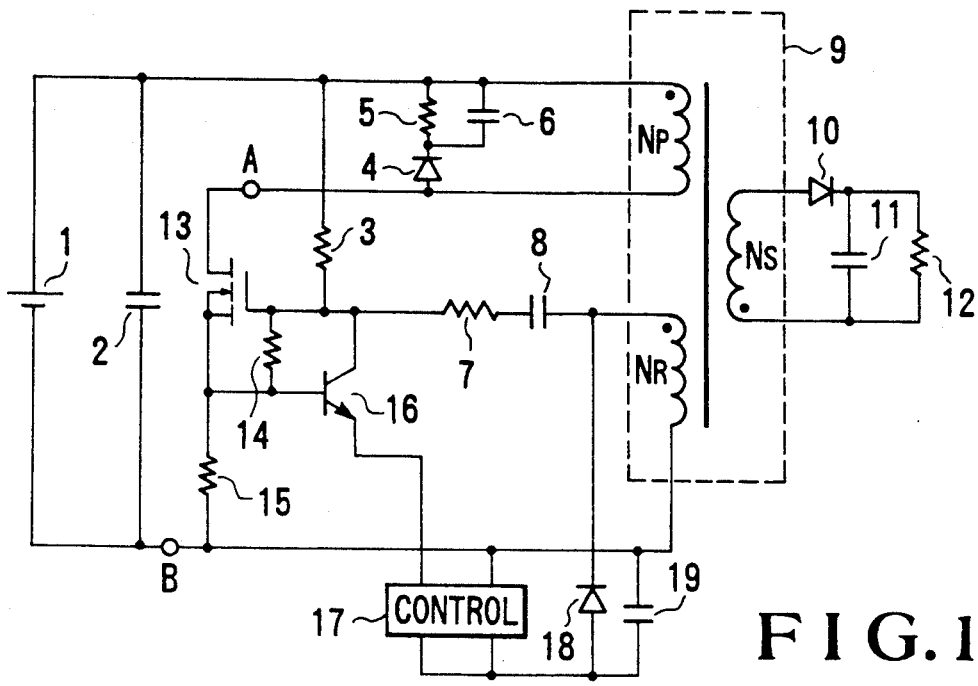
FIG. 1 is a circuit diagram showing a converter according to an embodiment of the present invention.

FIG. 1 is a circuit diagram showing a converter according to an embodiment of the present invention. FIG. 1 is a circuit diagram partially showing blocks of the converter. The same reference numerals as in FIG. 8 denote the same parts in FIG. 1, and a description thereof will be omitted.

Figure 8:
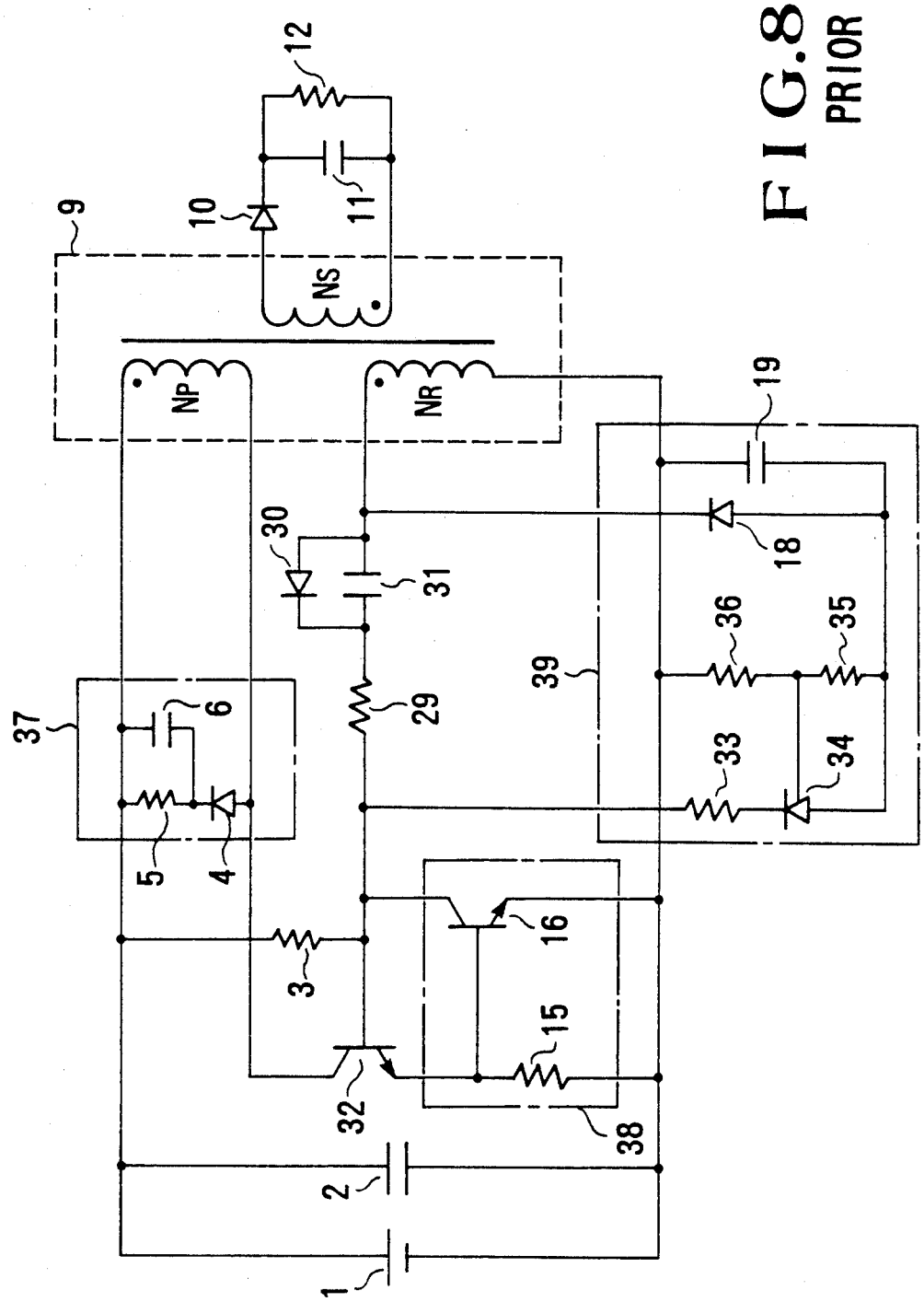
FIG. 8 is a circuit diagram showing a conventional converter.

In this embodiment, unlike the converter shown in FIG. 8, a field effect transistor 13 is used in place of the switching transistor 32. That is, one terminal of a resistor 15 is connected to the source of the field effect transistor 13, and the base of a transistor 16 is connected to the connection point between the source of the field effect transistor 13 and the resistor 15. The collector of the transistor 16 is connected to the gate of the field effect transistor 13. A resistor 14 is connected between the gate and source of the field effect transistor 13, and a control circuit 17 is connected to the emitter of the transistor 16. Reference numerals 7 and 8 denote a resistor and a capacitor, respectively.

In the converter arranged as described above, when a current from an input DC power source 1 is supplied, the field effect transistor 13 is turned on by a voltage divided by a starting resistor 3 and the resistors 14 and 15. While an energy is stored in a voltage transformer 9, a current flows through the field effect transistor 13 and the resistor 15. When the current has a predetermined value, a voltage for turning on the transistor 16 is generated from the resistor 15 to lower the gate potential of the field effect transistor 13 through the transistor 16 and the control circuit 17. Subsequently, the field effect transistor 13 is turned off, and the energy stored in the voltage transformer 9 is supplied to a load 12 through a rectification diode 10 and a smoothing capacitor 11. The control circuit 17 detects a variation in output voltage and turns the transistor 16 on/off. With the above sequential operation, the field effect transistor 13 is turned on/off, thereby stabilizing the output voltage.

FIGS. 2 to 5 show arrangements of the control circuit 17 shown in FIG. 1 according to this embodiment.

Figure 2:
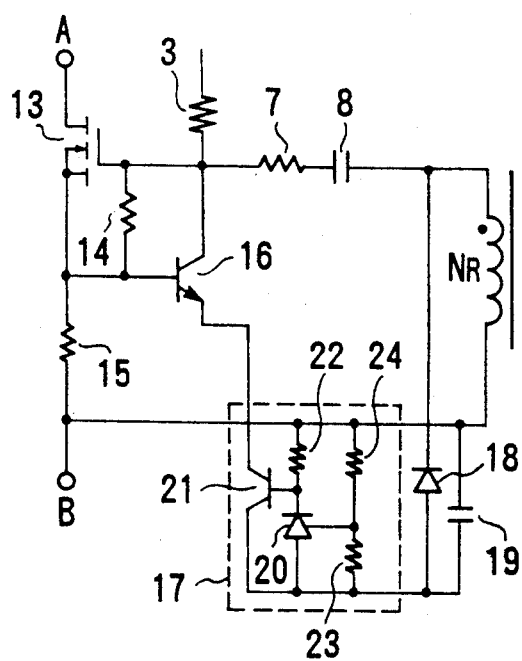
FIGS. 2 to 5 are circuit diagrams showing arrangements of a control circuit of the converter shown in FIG. 1.

In the control circuit 17 shown in FIG. 2, an output potential detected on the primary side is divided by resistors 23 and 24 to obtain a voltage. Using this voltage, a transistor 21 is controlled through a variable shunt regulator 20 to turn the transistor 16 on/off, thereby stabilizing the output voltage. In this case, the transistor 21 and a resistor 22 have a function of turning the transistor 16 on in an initial state.

Figure 3:
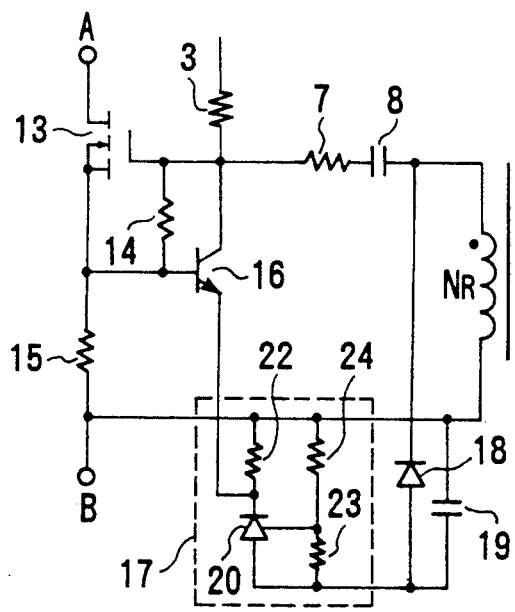

In the control circuit 17 shown in FIG. 3, an output potential detected on the primary side is divided by the resistors 23 and 24 to obtain a voltage. Using this voltage, the variable shunt regulator 20 directly controls the transistor 16 to turn on/off, thereby stabilizing the output voltage. In this case, the resistor 22 has a function of turning the transistor 16 on in an initial state.

Figure 4:
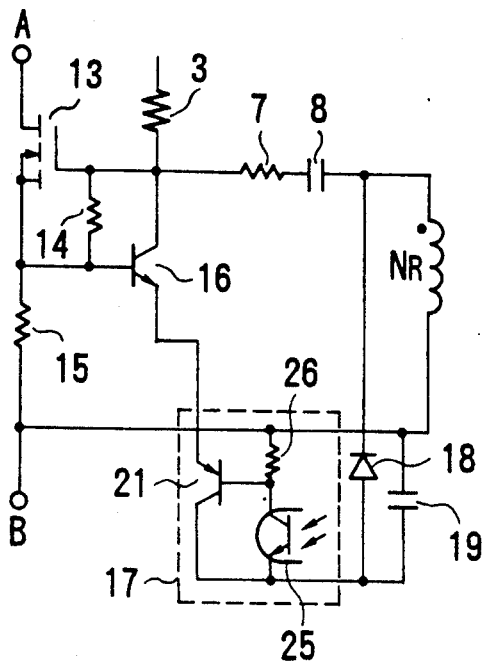

In the control circuit 17 shown in FIG. 4, using an output potential detected on the secondary side, the transistor 21 is controlled by an insulating element or photocoupler 25 which is actuated by a light emitting diode (LED) (symbolically shown by dual arrows in FIGS. 4, 5) to turn the transistor 16 on/off, thereby stabilizing the output voltage. In this case, the transistor 21 and a resistor 26 have a function of turning the transistor 16 on in an initial state.

Figure 5:
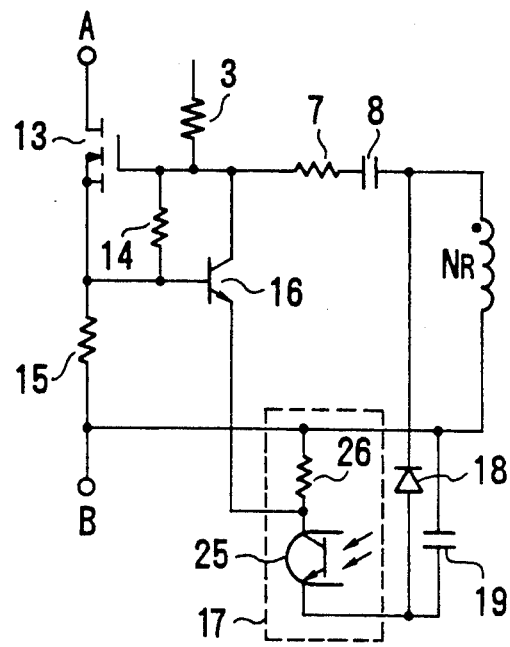

In the control circuit 17 shown in FIG. 5, using an output potential detected on the secondary side, the insulating element 25 directly controls the resistor 16 to turn on/off, thereby stabilizing the output voltage. In this case, the resistor 26 has a function of turning the transistor 16 on in an initial state.

Figure 6:
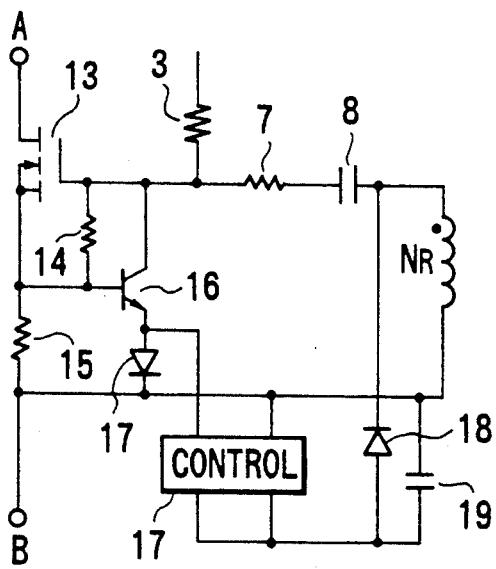
FIGS. 6 and 7 are circuit diagrams showing modifications of the converter shown in FIG. 1.
Figure 7:
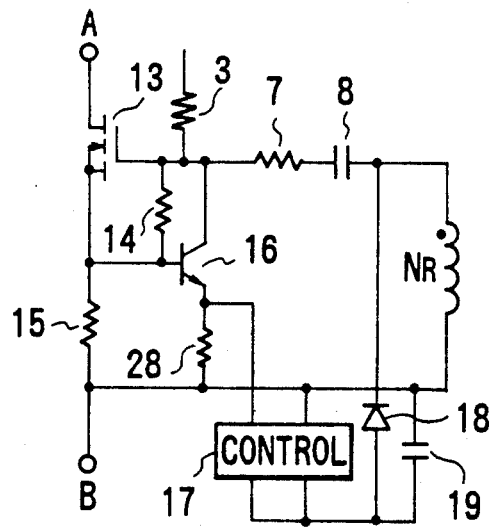

FIG. 6 shows a converter obtained by arranging a diode 27 between the emitter of the transistor 16 and the other terminal of the resistor 15 in the converter shown in FIG. 1. When the diode 27 is arranged, an ON operation of the transistor 16 can be reliably performed in an initial state. Note that, as shown in FIG. 7, a resistor 28 may be used in place of the diode 27.

As described above, according to the converter of the present invention, one terminal of a resistor is connected to the source of the first transistor, and the base of the second transistor is connected to the connection point between the source of the first transistor and the resistor. The collector of the second transistor is connected to the gate of the first transistor, and a control circuit is connected to the emitter of the second transistor. Therefore, when a field effect transistor is used as a switching transistor, the switching speed of the switching transistor can be increased, and the converter can be formed to be compact.

Figure 9:
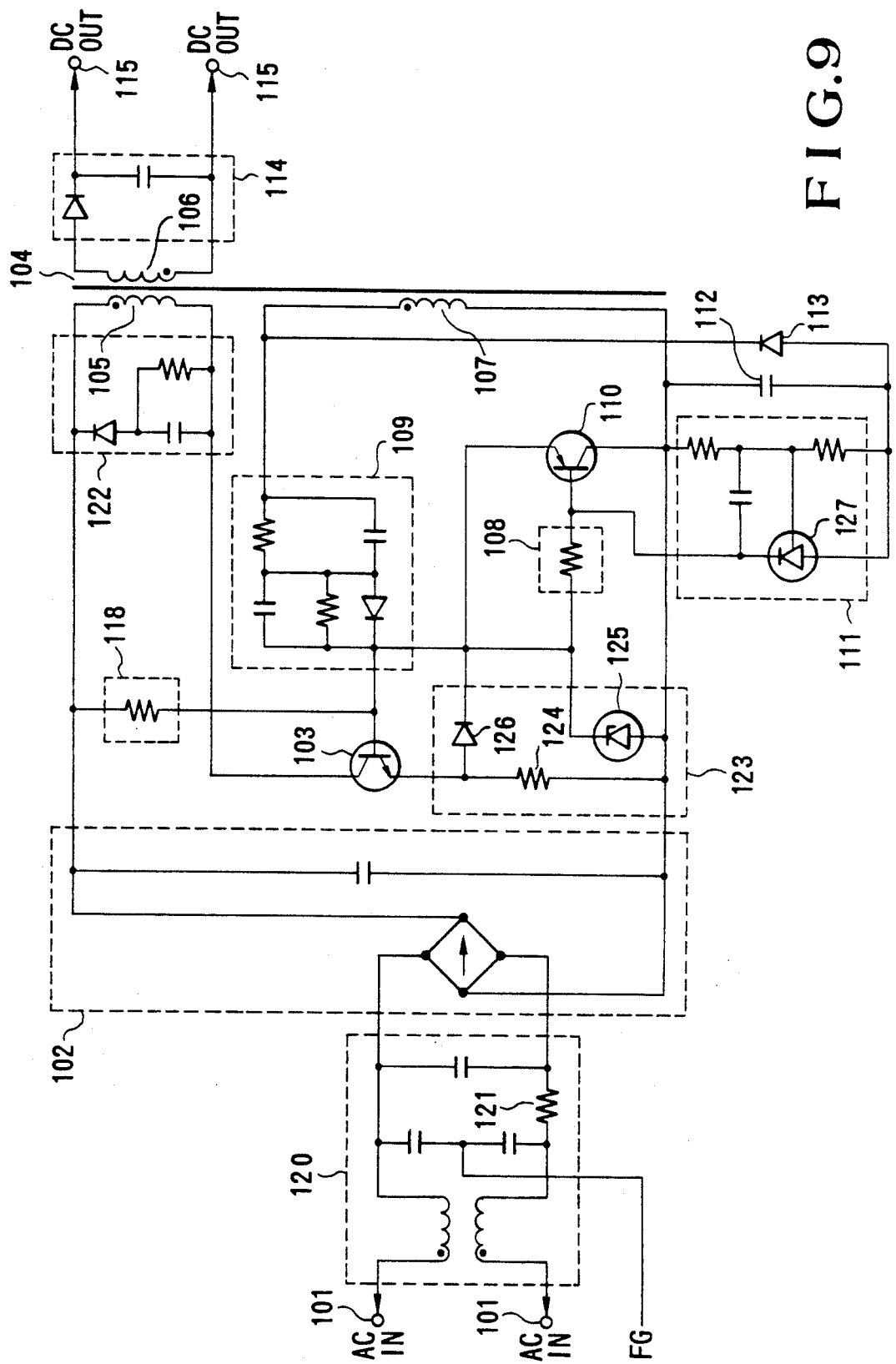
FIG. 9 is a circuit diagram showing a converter according to another embodiment of the present invention.

FIG. 9 is a circuit diagram showing another embodiment of the present invention. Referring to FIG. 9, reference numeral 120 denotes an input filter circuit for preventing that a switching frequency component and its harmonic-component noise are reflected on an input side; 121, a entry current protection circuit for regulating an entry current supplied to an input capacitor in a start operation; 102, a rectifier for smoothing an AC input voltage to output a DC power; and 118, a starting circuit for supplying a base current to turn a switching transistor 103 on in the start operation. A switching transistor protection circuit 123 detects the emitter current of the switching transistor 103 by an emitter resistor 124, regulates the emitter current by a Zener diode 125 to protect the switching transistor 103 and prevents the base-emitter of the switching transistor 103 from being reverse-biased by a diode 126. A first impedance circuit 108 supplies a large amount of current to a control transistor 110 since the voltage between the base and emitter of the control transistor 110 is increased when a current supplied to a control circuit 111 is increased. The control circuit 111 uses a control voltage halfwave-rectified by a control winding 107 of a transformer 104, the diode 113, and a capacitor 112 as an input and compares the divided voltage of the input control voltage with a reference voltage of a shunt regulator 127 to control a cathode current of the shunt regulator 127. A second impedance circuit 109 supplies a base current from the control winding 107 to the switching transistor 103 to turn it on, increases a switching speed by a speed-up capacitor, and prevents a base winding from receiving a starting current by a diode in a start operation. A snubber circuit 122 absorbs a serge voltage of a primary winding 105 of the transformer 104 to regulate the collector-emitter voltage of the switching transistor 103 when the switching transistor 103 is turned off. A rectifier 114 smoothes a pulse voltage of a secondary winding 106 of the transformer 104 to output a DC output voltage to an output terminal 115.

With the above arrangement, the control circuit 111 monitors the control voltage (voltage applied across the two terminals of the capacitor 112), supplies a part (control current) of a current which flows through the second impedance circuit 109 and is proportional to the input voltage of the converter to the emitter of the control transistor 110, and controls the current supplied to the emitter by a current (current which may be considered as the base current of the control transistor 110) supplied to the output of the control circuit 111. As described above, the control current of the control transistor 110 is controlled by the control circuit 111, and the control current is supplied to the low-potential side to keep the control voltage constant, thereby stabilizing the output voltage of the converter.

Figure 10:
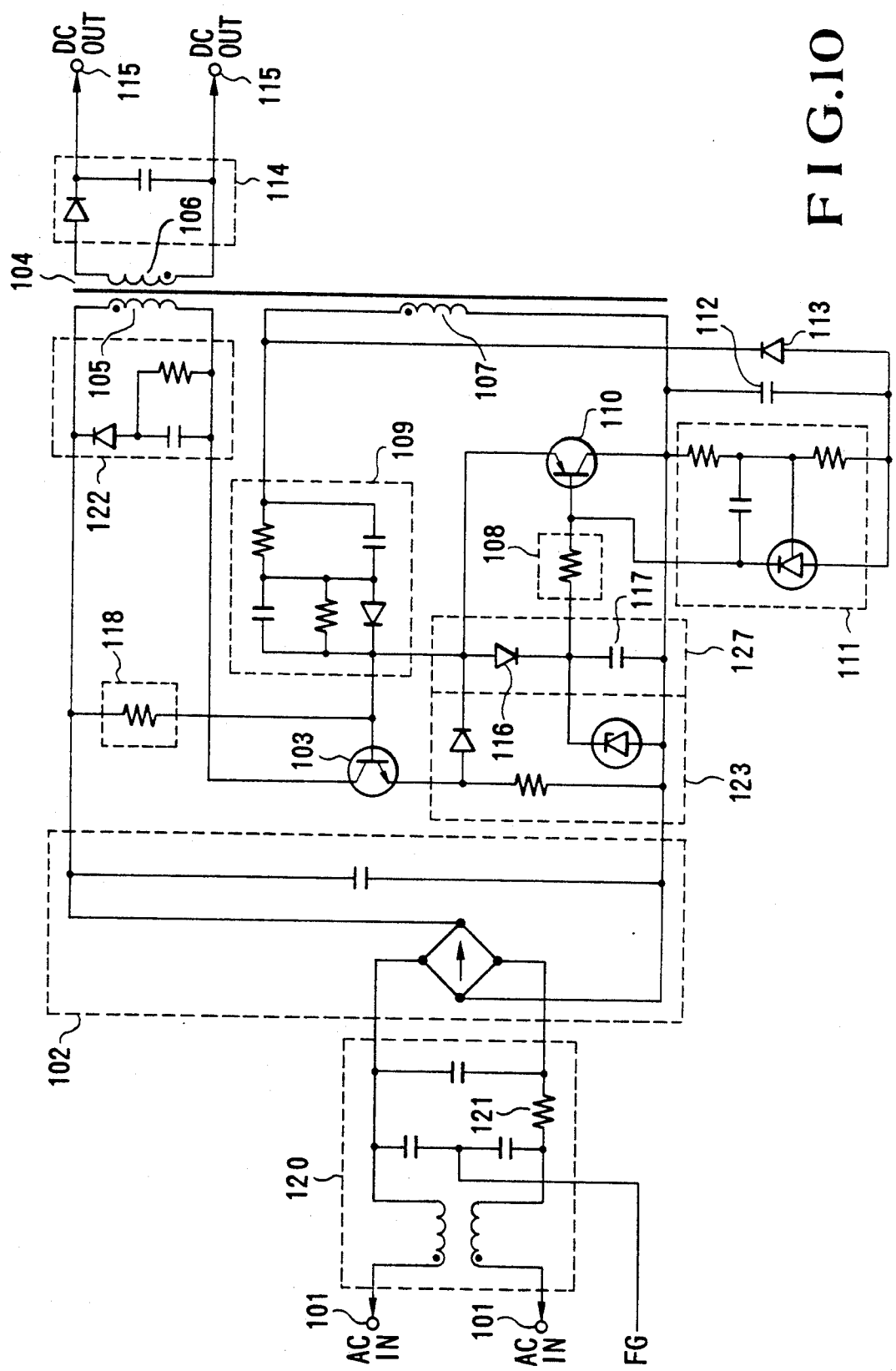
FIG. 10 is a circuit diagram showing a converter according to still another embodiment of the present invention.

FIG. 10 is a circuit diagram showing still another embodiment of the present invention. The circuit in FIG. 10 is obtained by adding a soft-start circuit 127 constituted by a capacitor 117 and a diode 116. The capacitor 117 draws a base current supplied to the switching transistor 103 (in general, the current is excessively supplied to over-drive the switching transistor 103) in a start operation, and a diode 116 is connected to the soft-start circuit 127 to prevent a polar capacitor from reverse-biasing. Therefore, a starting current is supplied to the capacitor 117 in a start operation to obtain a soft-start function of slowly increasing the output voltage of the converter.

As described above, according to the present invention, only when a current of 1/(current amplification factor of the control transistor) (1/hfe) of the control current is supplied to the output terminal of a control voltage detector, the output voltage of the converter can be stabilized. For this reason, even when a current supplied to the output terminal of the control voltage detector is small and changed within a narrow range, the output voltage of a converter having a wide input voltage variable range and a wide load variable range can be controlled. In addition, since the control current supplied to the control voltage circuit is 1/hfe, the efficiency of a converter having a high input voltage and a light load is not degraded.

Figure 11:
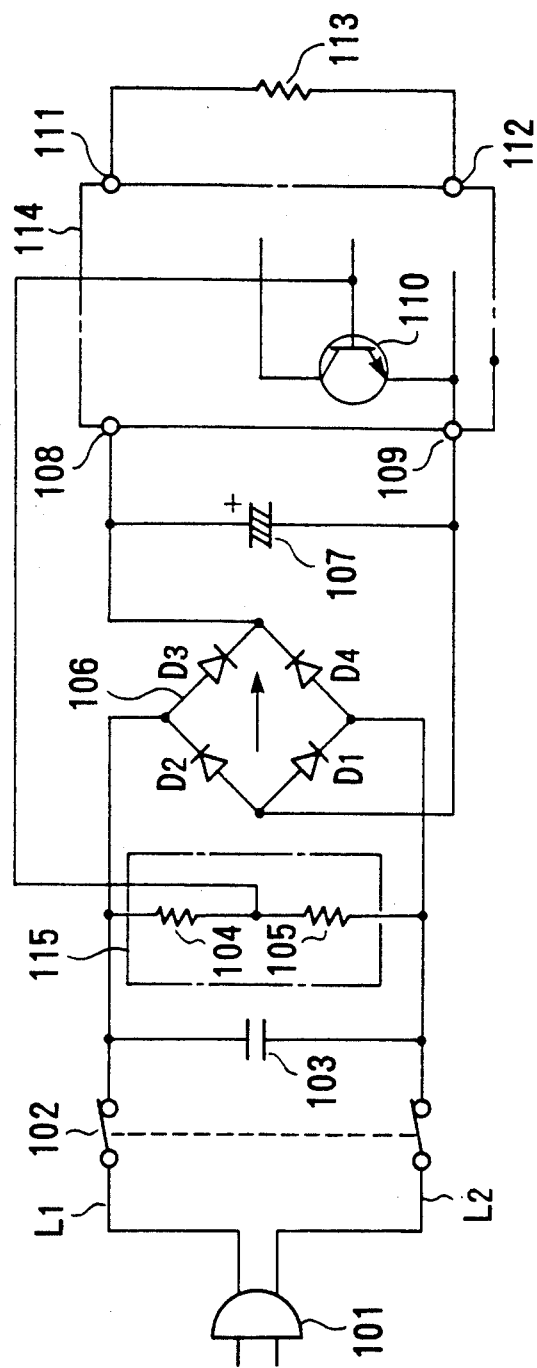
FIG. 11 is a circuit diagram showing an embodiment of a starting circuit of an AC input converter according to the present invention.

FIG. 11 is a circuit diagram showing a starting circuit of an AC input converter according to the embodiment of the present invention.

In this starting circuit, a series circuit 215 constituted by resistors 204 and 205 is connected across the two, terminals of a filter capacitor 203, i.e., parallel to the filter capacitor 203. The base of a switching transistor 210 is connected to the connection point between the resistors 204 and 205 of the series circuit 215. The filter capacitor 203 and a bridge diode 206 are connected between AC input lines L1 and L2 through a power source switch 202. An electrolytic capacitor 207 is connected between the rectification output terminals of the bridge diode 206, one and the other terminals of the electrolytic capacitor 207 are connected to input terminals 208 and 209 of a converter unit 214. In the converter unit 214, the emitter of the switching transistor 210 is connected to the input terminal 209. A load resistor 213 is connected between output terminals 211 and 212 of the converter body 214.

In the starting circuit arranged as described above, when the AC input line L1 has a positive polarity and the AC input line L2 has a negative polarity at a timing wherein the power source switch 202 is turned on, a starting current flows in a path passing from the base and emitter of the switching transistor 210 to a diode $D_1$ through the resistor 204, and the switching transistor 210 begins to be operated. When the AC input line L2 has a positive polarity and the AC input line L1 has a negative polarity at a timing wherein the power source switch 202 is turned on, a starting current flows in a path from the base and emitter of the switching transistor 210 to a diode $D_2$ through the resistor 205, and the switching transistor 210 begins to be operated. That is, according to the starting circuit of the present invention, the starting current is supplied to the switching transistor 210 by the AC voltages through the resistors 204 and 205, and a starting time is shortened compared with a conventional starting circuit.

In the starting circuit of this embodiment, when the power source is set in an OFF state, charges accumulated in the filter capacitor 203 are discharged through the series circuit 215 constituted by the resistors 204 and 205, the base of the switching transistor 210, and the diode $D_1$ ($D_2$). Therefore, even when a naked hand of an operator touches an AC plug 201 which is drawn from an outlet without turning the power source switch 202 off, he or she does not receive an electric shock.

In the starting circuit according to the present invention, when at least one of resistors 204 and 205 is broken in an open mode, the start operation can be reliably performed by the remaining resistor.

What is claimed is:
1. A converter comprising:
   a voltage transformer having a primary winding, a secondary winding, and a control winding;
   a switching transistor connected in series with said primary winding;
   a control transistor having an emitter connected to a control electrode of said switching transistor and a collector connected to one terminal of an input power source;
   an impedance circuit connected between a base of said control transistor and a control electrode of said switching transistor; and
   a control circuit for controlling a base potential of said control transistor on the basis of a control voltage extracted from said control winding.
2. A converter according to claim 1, wherein said impedance circuit is a resistor.
3. A converter according to claim 1, wherein said impedance circuit is a parallel circuit constituted by a resistor and a capacitor.
4. A converter according to claim 1, further comprising a diode connected between said impedance circuit and the control electrode of said switching transistor, and a capacitor connected between a connection point between said diode and said impedance circuit and said one terminal of the input power source.
5. A converter comprising:
   a voltage transformer having a primary winding, a secondary winding, and a control winding;
   a switching transistor connected in series with said primary winding;
   a control transistor having an emitter connected to a control electrode of said switching transistor and a collector connected to one terminal of an input power source;
   an impedance circuit connected between a base of said control transistor an a control electrode of said switching transistor;
   a control circuit for controlling a base potential of said control transistor on the basis of a control voltage extracted from said control winding; and
   a filter capacitor connected between AC input lines and a starting circuit which is connected between the inputs of the diode bridge with outputs connected to said primary winding as a series circuit constituted by a first resistor and a second resistor connected in parallel with said capacitor, wherein a connection point between said first and second resistors is connected to the control electrode of said switching transistor.

* * * * *